(12) United States Patent
Stark et al.

(10) Patent No.: US 7,515,797 B2
(45) Date of Patent: Apr. 7, 2009

(54) OPTICAL HARNESS ASSEMBLY AND METHOD

(75) Inventors: Jason Blain Stark, Holmdel, NJ (US); Gadi Lenz, Fanwood, NJ (US); Bradley Scott Jackson, Holmdel, NJ (US)

(73) Assignee: Defense Photonics Group, Inc., South Plainfield, NJ (US)

( * ) Notice: Subject to any disclaimer, the term of this patent is extended or adjusted under 35 U.S.C. 154(b) by 0 days.

(21) Appl. No.: 12/098,259

(22) Filed: Apr. 4, 2008

(65) Prior Publication Data
US 2008/0187270 A1    Aug. 7, 2008

Related U.S. Application Data

(62) Division of application No. 11/365,982, filed on Mar. 1, 2006, now Pat. No. 7,362,936.

(51) Int. Cl.
*G02B 6/44* (2006.01)
(52) U.S. Cl. ................................. 385/101; 385/100
(58) Field of Classification Search .............. 385/101
See application file for complete search history.

(56) References Cited

U.S. PATENT DOCUMENTS

| | | | |
|---|---|---|---|
| 4,767,168 A | 8/1988 | Grady | |
| 4,895,426 A | 1/1990 | Pinson | |
| 4,930,049 A | 5/1990 | Davenport et al. | |
| 5,212,750 A | 5/1993 | Wright | |
| 5,844,236 A | 12/1998 | Wilson | |
| 6,052,632 A | 4/2000 | Iihoshi et al. | |
| 6,222,976 B1 | 4/2001 | Shahid | |
| 6,351,590 B1 | 2/2002 | Shahid | |
| 6,519,395 B1 | 2/2003 | Bevan et al. | |
| 6,694,083 B2 | 2/2004 | Paradiso et al. | |
| 6,978,319 B1 | 12/2005 | Rostoker et al. | |
| 7,044,656 B1 | 5/2006 | Hofmeister et al. | |
| 7,362,936 B2 * | 4/2008 | Stark et al. ................. 385/106 |
| 2002/0159725 A1 | 10/2002 | Bucklen | |

OTHER PUBLICATIONS

PCT/ISA/220, "Notification of Transmittal of the International Search Report . . . ", for PCT/US07/04686, mailed Aug. 22, 2008, (3 Pgs).
PCT/ISA/210, "International Search Report", for PCT/US07/04686, mailed Aug. 22, 2008, (2 Pgs).
PCT/ISA/237, "Written Opinion of the International Searching Authority", for PCT/US07/04686, mailed Aug. 22, 2008, (6 Pgs).

* cited by examiner

*Primary Examiner*—Michelle R Connelly Cushwa
*Assistant Examiner*—Rhonda S Peace
(74) *Attorney, Agent, or Firm*—Maldjian & Fallon LLC; John P. Maldjian, Esq.; Jon Fallon, Esq.

(57) ABSTRACT

An optical cable harness assembly and method are provided. The optical cable harness assembly includes at least one optical cable harness having a termination end; at least one electrical connector having connector pins; and at least one active connector conversion unit coupled between the termination end of the optical harness cable and the electrical connector. A method for retrofitting an optical harness assembly into an existing platform is disclosed. The method includes removing a legacy wiring harness; installing an optical harness assembly having electrical connectors and an active connector conversion unit; and testing the compatibility of connector pins of the electrical connector to the active connector conversion unit.

12 Claims, 5 Drawing Sheets

OPTICAL HARNESS ASSEMBLY AND METHOD

CROSS-REFERENCE TO RELATED APPLICATIONS

This application is a divisional application of U.S. patent application Ser. No. 11/365,982 filed Mar. 1, 2006, now U.S. Pat. No. 7,362,936 entitled "Optical Harness Assembly and Method", which is herein incorporated by reference in its entirety.

BACKGROUND

1. Field of the Invention

Embodiments of the present invention generally relate to wiring harnesses and methods and, more particularly, to optical harness assemblies and methods for retrofitting same into legacy systems.

2. Description of the Related Art

Vehicles, aircraft and watercraft, both commercial and military, include a wide range of onboard electrical and electronic equipment for command and control, communication and defense applications. Electrical (e.g., copper) wiring harnesses are commonly employed in such applications as part of the power distribution and communication network between and among the onboard hardware, such as terminal equipment or line-replaceable units ("LRUs").

Where factors such as weight, size, reliability, maintainability, supportability, environmental effects and total ownership costs are important, as in aircraft and watercraft platforms, electrical wiring harnesses have certain shortcomings. They are relatively heavy, bulky and inflexible. Wiring harnesses also contribute to undesirable radio frequency interference ("RFI") and other electromagnetic interference ("EMI") effects.

For example, on military aircraft such as rotorcrafts or small unmanned aerial vehicles ("UAVs"), weight and size are major factors. These aircraft need as much spare payload and space as possible. Reducing the weight and size of the wiring harnesses leads to a higher rate of ascent, a longer flight endurance and greater payloads. Equally, reliability, maintainability, RFI and EMI immunity are important considerations when designing and implementing wiring harnesses for these types of applications. Furthermore, it is undesirable to remove, replace or redesign onboard terminal equipment (e.g., LRUs) as a result of the replacement of a wiring harness. Rather, it would be desirable to be able to replace legacy harnesses without disturbing the LRUs and their electrical connections.

Thus, there is a need in the art for an improved harness assembly having an architecture that is relatively lighter and smaller, reliable, maintainable, minimizes RFI and EMI and provides a minimal impact to existing LRUs. There is also a need for a harness assembly that is retrofittable into existing legacy platforms and that minimizes the need to replace or reconfigure terminal equipment and network architecture.

SUMMARY

In one embodiment of the present invention, there is provided an optical harness assembly including at least one cable harness having a termination end; at least one electrical connector having connector pins for transporting electrical signals; and at least one active connector conversion unit coupled between the termination end of the optical harness and the electrical connector. The at least one cable harness may include at least one optical fiber for transporting optical signals, the at least one optical fiber having a first end and a second end, wherein the first end is coupled to the active connector conversion unit for converting optical signals to electrical signals.

The harness assembly may alternatively include at least one conductor for transporting power, the at least one power conductor having a first end and a second end, wherein the first end is coupled to the at least one active connector conversion unit. Alternatively, this power conductor may be connected directly to the electrical connector and bypass the active connector conversion unit.

In accordance with another embodiment of the present invention, there is provided a multi-point distributed optical communications network that includes: a plurality of cable harnesses, each having at least one optical fiber for carrying optical signals, each optical fiber having a first end and a second end; a plurality of active connector conversion units, each having a first end and a second end, the first end of each active connector conversion unit being coupled to respective first ends of the optical fibers; a plurality of electrical connectors for connecting to terminal equipment or LRUs, each electrical connector coupled to the respective second ends of the plurality of active connector conversion units, and alternatively also connected to power conductors; and an optical signal distribution device connected to respective second ends of the respective optical fibers for networking the plurality of harnesses onto a communication bus of the multi-point distributed optical communication network. In an embodiment, the optical signal distribution device comprises a star coupler.

In accordance with another embodiment of the present invention, there is provided a method of retrofitting an optical harness assembly, as described herein, into a legacy platform. The optical harness assembly includes at least one cable harness having a termination end; at least one electrical connector having connector pins for transporting electrical signals; and at least one active connector conversion unit coupled between the termination end of the cable harness and the electrical connector, the method including: removing a legacy wiring harness; installing the optical harness assembly; and testing the compatibility of the connector pins of the electrical connector with the active connector conversion unit so that the terminal equipment and the harness circuitry can remain the same.

The testing step may include transmitting a data packet over the network bus to the terminal equipment; detecting the received data packet; and checking the cyclical redundancy check (CRC) for validity. In one embodiment, if the CRC is determined to be invalid, then the method may further include mapping the connector pins of the electrical circuit through an adaptor means to the I/O ports of signal conditioning circuitry of the active connector conversion unit to avoid LRU replacement.

In accordance with another embodiment of the present invention, there is provided a method for adapting electrical presentations of legacy terminal equipment to the active connector conversion unit described herein. The method includes: identifying electrical signals present on each pin of each electrical connector presentation; programmatically adjusting an interface, between the electrical connector presentation and the active connector conversion unit, based on the identified electrical signals present; and mapping the electrical connector signals to digital signals.

The interface may include hardware, software or firmware logic. The interface may include firmware logic loaded into a field programmable gate array (FPGA) as described herein.

The mapping of electrical signals to digital signals may be performed by signal conditioners as described herein.

Alternatively, the method may further include: providing a personality adaptor coupled between the electrical connector pin outs and the signal conditioners of the active connector conversion unit as described herein; configuring the personality adaptor based on the identified electrical signals present on each pin out of each electrical connector presentation; and providing configured electrical connector presentation signals to the interface.

BRIEF DESCRIPTION OF THE DRAWINGS

The teachings of embodiments of the present invention will become apparent by considering the following detailed description in conjunction with the accompanying drawings, in which.

Where possible, identical reference numerals are used herein to designate identical elements that are common to the figures. The images in the drawings are simplified for illustrative purposes and are not depicted to scale. The appended drawings illustrate exemplary embodiments of the present invention and, as such, should not be considered as limiting the scope of the present invention that may admit to other equally effective embodiments.

DETAILED DESCRIPTION

Figure 1:
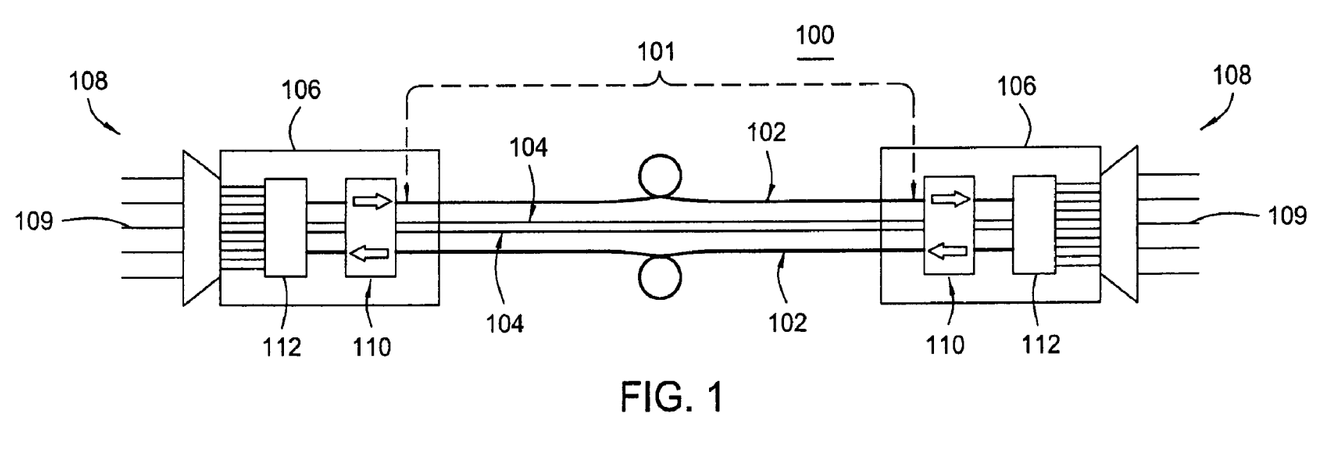
FIG. 1 depicts a schematic diagram of a point-to-point optical harness assembly in accordance with an embodiment of the present invention.

FIG. 1 illustrates an optical harness assembly 100 in accordance with an embodiment of the present invention. The harness assembly 100 includes an optical cable harness 101, which contains optical fibers 102 for carrying signals, and, alternatively, as a hybrid optical cable harness, may contain power conductors 104 for conducting power. The harness assembly 100 also includes active connector conversion units 106 coupled to the cable harness 101 at both ends, and electrical connectors or terminations 108, coupled to the active connector conversion units 106, also exemplary at both ends. The electrical connectors 108 each include connector pins 109 for conducting electrical signals to and from the terminal equipment.

Alternatively, the optical harness assembly 100 may contain an active connector conversion unit 106 and one electrical connector 108 coupled thereto on one end (i.e., the termination end) of the harness assembly 100, wherein the other end of the harness assembly 100 terminates on a network bus as part of a optical communication network.

As described above, the cable harness 101 may consist of a hybrid cable harness of optical fibers and power conductors, terminating at one end with an active connector conversion unit. The other end may not include an active connector conversion unit but rather terminate on a communication network bus. Alternatively, and as shown, the cable harness may terminate on both ends with an active connector conversion unit 106 if configured as a point-to-point harness assembly. As mentioned, the cable harness 101 may contain one or more conductors 104 for transporting power and one or more optical fibers 102 for transporting data signals. However, alternatively, the power conductors 104 may be located outside of the optical cable harness 101 and connected to the electrical connectors 108, either directly, or through active connector conversion unit 106.

The power conductors 104 may alternatively be included in the harness 101 but not travel through the active connector conversion unit 106. That is, the power conductors 104 could be separate and apart from the optical cable harness 101 and directly connected to the electrical connectors 108 for powering the LRU's or be part of the harness 101 and directly connected to the electrical connectors 108, thus not coupled to the active connector conversion units 106 (see FIG. 4). Because it is less desirable to send power over light, all power signals, power return, or grounds use copper as the conductor of energy in this embodiment. However, other conductive material such as aluminum, brass, steel, or other metals or semi-conductor material may be used. This embodiment of the present invention does contemplate using fiber optic cable to transport power.

Different embodiments of power redundancy are contemplated by the present invention. The first is to have two power supplies per harness, each of which could supply all of the required power. Alternatively, there is provided multiple parallel power supplies. In this embodiment, multiple parallel power supplies are used to deliver the required total power, and additional supplies are added to provide redundancy. This scheme allows for redundancy with smaller backup supplies. For example, if 1 amp is required, then 2 supplies at 1 amp each are required. In a second case, three power supplies each at 0.5 amps can deliver a total of 1.5 amps and can tolerate a single power supply failure.

The active connector conversion unit 106 includes electrical to optical (E/O) conversion devices 110, and signal conditioning circuitry 112 where every signal is converted (digitized or level shifted as appropriate) and multiplexed into a single data stream. This data stream is encoded and framed to allow robust, error-free transmission. At the electrical to optical (E/O) devices 110 of the active connector conversion unit 106, optical signals are detected, de-framed, and converted back into the original signal format and levels.

Because the data signals are optical signals in this embodiment, there may be no need to shield the entire length of the optical cable harness 101 for EMI shielding. In this case, the shielding is, for example, moved from the length of the entire harness in the legacy systems to only the endpoints of the harness in embodiments of the present invention. This results in a relatively reduced diameter of the cable harness 101 and easier maintenance procedures.

The optical fibers 102 can carry the data signals to and from the active connector conversion unit(s) 106. Although two optical fibers 102 are shown for illustrative purposes, it is contemplated by the present invention that one optical fiber, or alternatively, a plurality of optical fibers may be used. The fiber may be single mode fiber or multi-mode fiber, available from Fitel USA Corp. of Norcross, Ga. and known by the trademark FLIGHTGUIDE, Model No. BF04673. This multi-mode fiber has a wide operating temperature range (−55 C to 165 C), excellent bend radius limit (6 mm long term), good bandwidth (200 MHz/km), and good loss (5 dB/km).

Because it is optical fiber, there is no coupling between the signal wires. As such, the diameter of the cable is substantially reduced, as well. After the replacement with the optical harness 101, the diameter is only about 0.125 inches. This significant reduction allows for a relatively more flexible harness, which can be relatively more easily routed throughout an aircraft, for instance. Conversion from legacy copper wired harnesses to optical harness assemblies can also represent a significant weight savings, on the order of about 47%.

Figure 2:
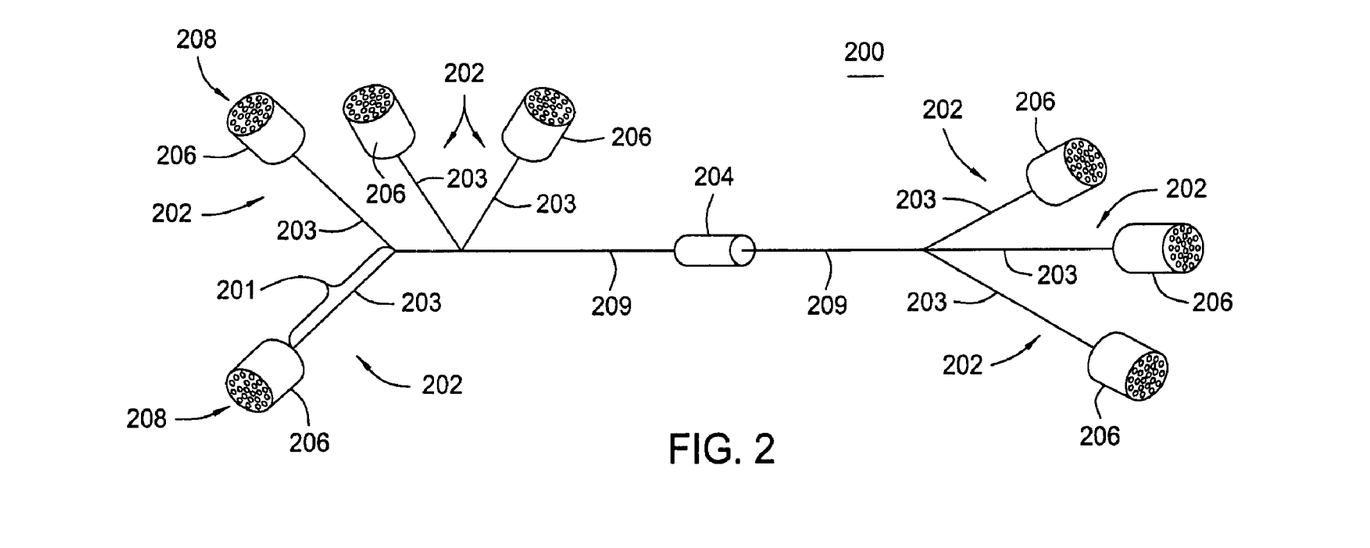
FIG. 2 depicts a schematic diagram of a multi-point optical harness assembly configuration using a plurality of the harness assembly of FIG. 1, including a star coupler to distribute the network traffic, in accordance with an embodiment of the present invention.

FIG. 2 depicts an optical communication network 200. The network 200 includes a plurality of optical harness assemblies 202 as described with respect to FIG. 1, all coupled to an optical signal distribution device 204, e.g., a star coupler, on a communication bus 209. The optical signal distribution device 204 is configured as a 4×4 port star coupler in this embodiment. Alternatively, for redundancy purposes, there may be two 4×4 port star couplers in a given harness, one for each redundant bus 209. The optical signal distribution device 204 described in this embodiment may be any N×N port device including a 5×5 port fused fiber star coupler housed in a metal tube, e.g., stainless steel, with fiber pigtails extending therefrom. Other optical signal distribution devices, e.g., star couplers, are contemplated by the present invention.

For each possibly redundant optical network bus, every receiver "sees" the transmissions from all active terminal equipment connected to the communication network. This is true even where there is no redundancy. This is the function of the optical signal distribution device, e.g., star coupler.

Optical connections from the active connector conversion units 206 to the optical fibers 202 in the cable can be via MIL-C-38999C or LC-style optical termini integrated into the design. These connectors are currently deployed in the military, and maintenance kits and procedures exist.

Figure 3:
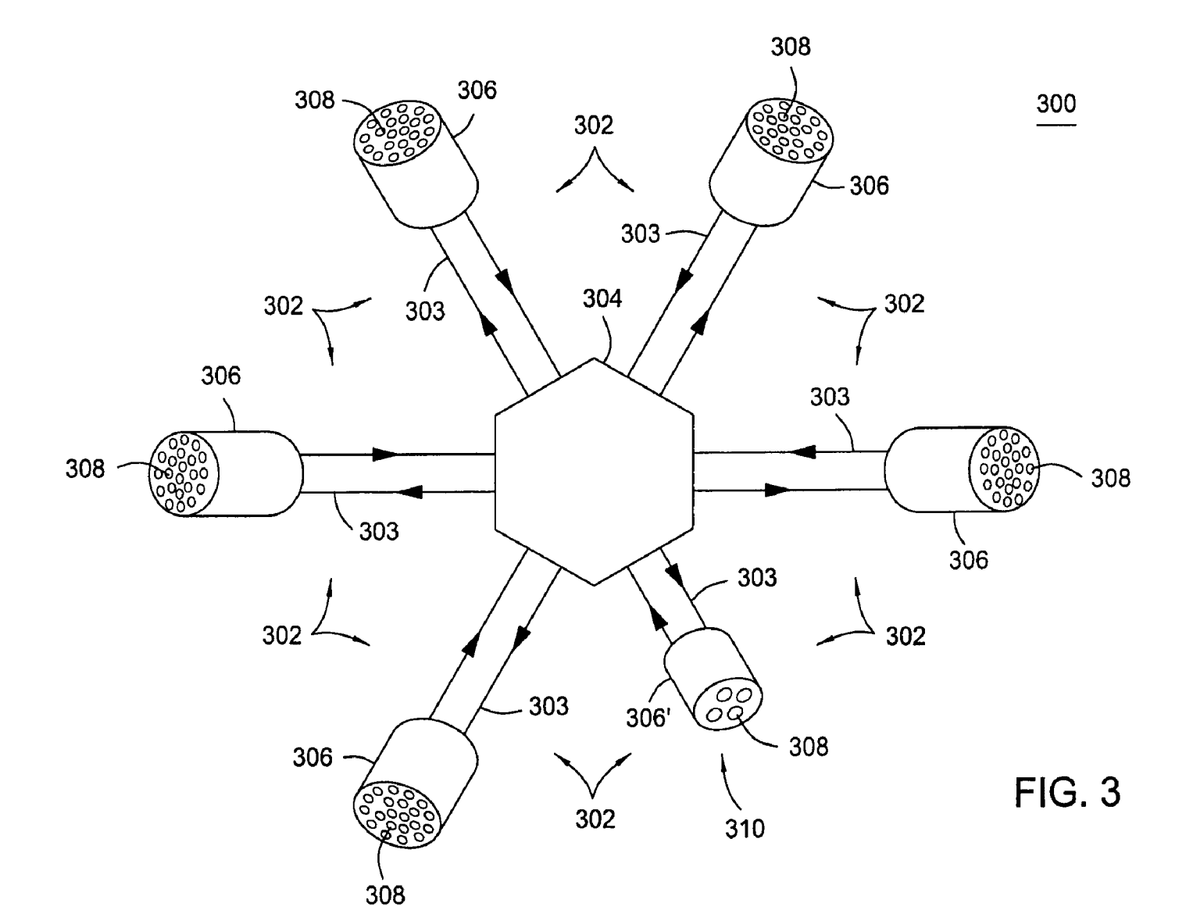
FIG. 3 depicts a schematic of the multi-point optical harness assembly of FIG. 2, including the star coupler and a spare port, in accordance with an embodiment of the present invention.

FIG. 3 depicts an embodiment of a multi-point distributed network 300 in accordance with the present invention. This network is similar to that described in FIG. 2; however, in addition to the elements described therein, this embodiment includes a spare port 310. This spare port 310, otherwise described herein as a diagnostic or maintenance port, is similar in design and characteristic as the other terminals and active conductor conversion units. However, it is contemplated by this embodiment of the present invention that this spare port 310 would not be assigned to any terminal equipment or LRU's when installed in a legacy platform. That is, when the harness assemblies are designed for a particular platform, in this embodiment, the assemblies include one port that is meant to be left as spare. The spare port 310 is used for at least diagnostics or maintenance purposes but may be used for any purpose necessary at the time the optical harness assemblies are installed. For example, the spare port may be needed as a permanent termination port where new terminal equipment has been added that was not previously planned.

Figure 4:
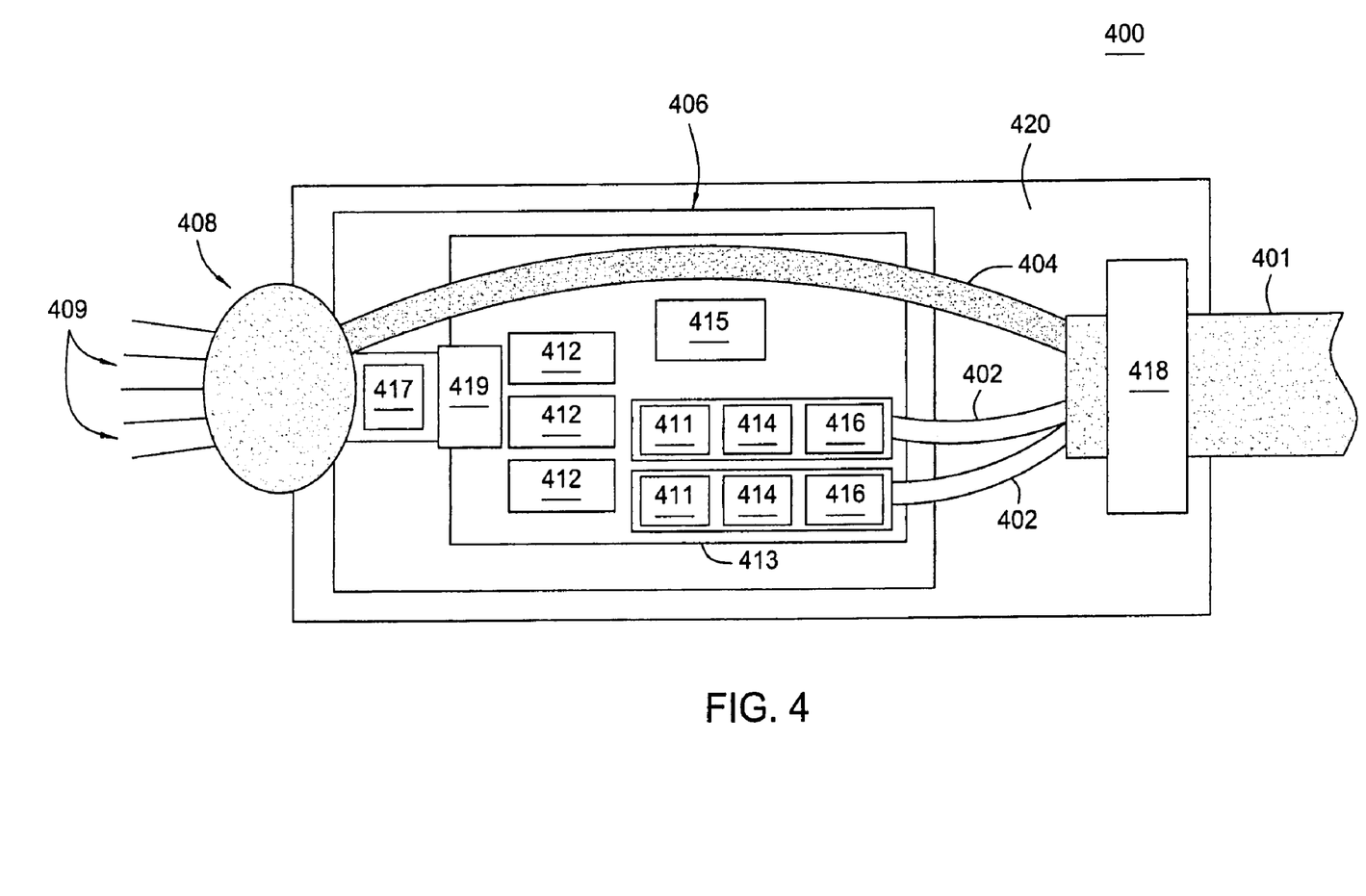
FIG. 4 depicts a block diagram of the active connector conversion unit of the optical harness assembly in accordance with an embodiment of the present invention.

FIG. 4 depicts a diagram of an exemplary termination end of an optical cable harness assembly 400 as described hereinabove. The assembly 400 includes a replaceable active connector conversion unit 406; an electrical connector 408 coupled to the active connector conversion unit 406; and an optical cable harness 401. The active connector conversion unit 406 is positioned inside a backshell 420 of the termination points of the optical cable harness 401.

In this embodiment, the optical harness assembly 400 includes a hybrid optical cable harness 401 and terminates with active connector conversion units 406. The hybrid cable harness 401 includes conductors 404 for the transportation of power and optical fibers 402 for the transportation of data signals. Because the data transported optically must be converted from electrical signals to an optical signal, conversion modules are included. These modules reside collectively on circuit board 413 inside the backshell 420 of the connectors 406 that terminate the harness 401. Alternatively, these modules may be located at a different area within the backshell 420.

On the side of the termination, opposite the cable harness 401 is an electrical connector presentation 408. This electrical connector 408, in this embodiment, is physically attached to the backshell 420. In this configuration, the backshell transfers the stress of the connector to a strain relief 418 on the harness cable 401, bypassing the electronics and optical components and devices inside the active connector conversion unit 406. The electronics and optics are replaceable units, and each termination contains possibly identical, firmware-configurable hardware to reduce sparing inventory.

The architecture of the optical harness assembly 400, upon replacing the current electrical harnesses with optical harnesses, can be the same as the original physical layout. In this architecture, the termination on each end of the legacy electrical harness is in effect replaced with a termination containing active optical electronics 406. Therefore, to the LRUs, this retrofit is virtually transparent from a mechanical standpoint. It is also desirably transparent from a firmware/software standpoint, once certain pin connector mapping is performed (see FIGS. 5 and 6 and the embodiments of the method described therein).

Electrical signals from the connector pins 409 are transmitted to an active connector conversion unit 406. In this embodiment, the signals are first transmitted through a personality adaptor 419. The personality adaptor 419 "maps" electrical connector pin signals to I/O on the active connector conversion unit circuit boards. For example, the circuit boards contain signal conditioning circuitry 412 (for instance, RS-422 terminations/drivers) that adapt the LRU signals from the pin outs to levels compatible with Field Programmable Gate Arrays ("FPGAs") 411 and alternatively also through A/D-D/A converters 416 to accommodate transmission of analog signals. Where appropriate, power supply voltages may also be synthesized and converted by power active connector conversion units 415 from the harness power and provided to the LRUs. Alternatively, the electrical signals may transfer from the connector pins to the FPGAs, without first transmitting through a personality adaptor. In this regard, it is contemplated that the FPGA receives electrical connector pin presentations in advance and are programmatically adjusted to accommodate the electrical connector presentations for each electrical connector so that the remaining components of the active connector conversion device 406 can remain the same for each active termination unit of the optical harness assembly 400.

The FPGAs 411 contain the transport layer packet framing algorithms and the protocol layer state machines that coordinate packet transmission on the optical fibers 402. The transmission protocols that are used in this embodiment may be deterministic, so the network lag is known and bounded. There are no variable network lags as that which occurs in collision/detect systems based on Ethernet-like protocols. Each FPGA 411 is field-programmed with backshell-specific firmware. The personality adaptor 419 contains a hardwired key that assures the backshell devices are programmed with the correct firmware. Alternatively, the personality adaptor 419 may be a logic device that is programmatically adjusted as necessary for each electrical connector presentation.

The cable sides of the FPGAs 411 drive and receive from optical transmitters and receivers that are coupled to the optical fiber using standard optical interconnects. These interconnects use standard optical termini, for which repair procedures, repair kits, and maintenance procedures are already in place and in use.

Similar to the harness assembly as described in FIG. 1, the backshell 420 of the active connector conversion unit 406, where the conversion to optical signals takes place, may be shielded from EMI. This provides the opportunity for shielding to be removed from the entire length of the harness and placed only on its endpoints, substantially reducing the weight associated with EMI protection.

Power is distributed from a power supply to each backshell 420. Both a power and a power ground are distributed to allow the active backshells to operate even when not connected to an LRU.

The optical harness assembly 400 shown and described hereinabove achieves significant weight savings through elimination of the weight of the wire, shields, and insulation associated with each signal pair. The optical fiber 402 is immune to EMI and produces no RFI, saving weight and allowing routing within the airframe without constraints near strong RF sources or sensitive detectors. Optical fiber also provides for a physically narrow harness, containing only two optical fibers and converter power (and possibly power, depending on the details of the harness implementation).

In each active connector conversion unit 406, the active electronics present loads and signal levels identical to those produced by drivers and receivers, so the terminations expected by the sensors and LRUs are preserved, and the optical harness substitution is transparent to the system platform. The same electrical presentations 408 presented in the legacy harness are used in this case. The contacts may have PCB board tails. The connector pins 409 connect to a header that is part of the personality adaptor 419. The heart of the header assembly is a short pin/socket contact. The tail of the contact accommodates standard through-hole diameters and thickness of the printed circuit board materials. The socket is imbedded in molded polymer, making electrical engagement with the printed circuit tail of the connector.

The header may be soldered to the flex circuit 417 of the personality adaptor 419. To change a damaged pin, for example, the backshell 420 is removed, the header is separated from the electrical connector 408 and, using the same tools as for the legacy connector, the connector pin 409 is removed and replaced. Mating the header with the connector and reassembling the backshell 420 reassembles the electrical connector 408.

In the embodiment shown in FIG. 4, high availability is achieved through redundancy in the optical network. Thus, each backshell 420 contains at least two optical transmitters/receivers 414, and these redundant pairs are interconnected with at least two independent optical fibers 402 through at least two respective optical connectors 416.

In one embodiment, the worst-case required bandwidth is on the order of 1 to 10 Mb/s, which is well within the capabilities of the optoelectronics. The active connector conversion unit assembly 406 fits inside the backshell 420 of the assembly 400. In this embodiment, the electrical presentation and optical interconnects terminate either end of the connector.

A rigid/flex circuit board 417 couples the electrical connector 408 with the active connector conversion unit 406. The rigid/flex circuit board 417 incorporates certain of the electro-optical functions. At the connector end of this circuit board is the personality adaptor 419, which maps the electrical signals into the appropriate inputs of the circuit board, as described above. The circuit boards are retained and waste heat transferred though a retention clip (not shown) to the outer shell (also not shown). The personality adaptor 419 is a somewhat rigid section that connects the legacy electrical connector with the active connector conversion unit 406. This unit has the header on one end and low profile connectors on the other end. Signals that remain in wire have their conductors terminated at the header end of this personality adaptor.

The rigid/flex circuit board 417 may take the shape of the connector. For example, the termination connector may take the shape of an elbow or 90 degree connection and the circuit board 417 is versatile to accept such physical configuration. This circuit board can stack and the stack can also be straightened for insertion into a straight backshell. Power lines (lines not converted for optical transmission) may pass through the circuit board from connectors in the harness end, or bypass the circuit boards, traveling directly from the harness 401 directly to the electrical connector 408.

The backshell assembly 420 supports the circuit board, provides heat transfer to ambient, provides EMI shielding, and supports the optical connectors. It is made up of adaptor rings to mate with the legacy connector, a circuit board holder, and an adaptor ring for a cable clamp. The adaptor rings spin freely before final engagement to allow the swept backshells to be properly oriented. The backshells may be constructed in a clam shell arrangement held together by the adapter rings. This allows for the readily removal and replacement of the circuit board.

In an alternative embodiment, a fault indicator (not shown) is mounted on the active connector conversion unit's circuit board so it is visible through an inspection window in the backshell 420. This fault indicator can be set or reset by the FPGAs 411, for example. This fault indicator will alternatively be black if no fault and will be red if there is a fault.

Network management is accomplished via any standard network transmission protocol, and in particular optical network protocols, such as SONET, SDH, Fibre Channel, MIL-STD-1773, or custom-designed protocols. Each termination contains logic that packages data to/from the signal conditioning and manages data streams sent to/from the optical transmitter/receiver.

In operation, the connectivity and interface presentation of the optical harness assembly is implemented at the connectors. The cabling infrastructure that comprises the backbone of the optical harness assembly 400, containing optical fiber 402 and powering conductors 404, is contemplated to be compatible with any implementation of the active connector conversion unit 406 terminations. As a result, the underlying communications backbone within the platform need not be replaced in order to upgrade termination equipment, for example.

Figure 5:
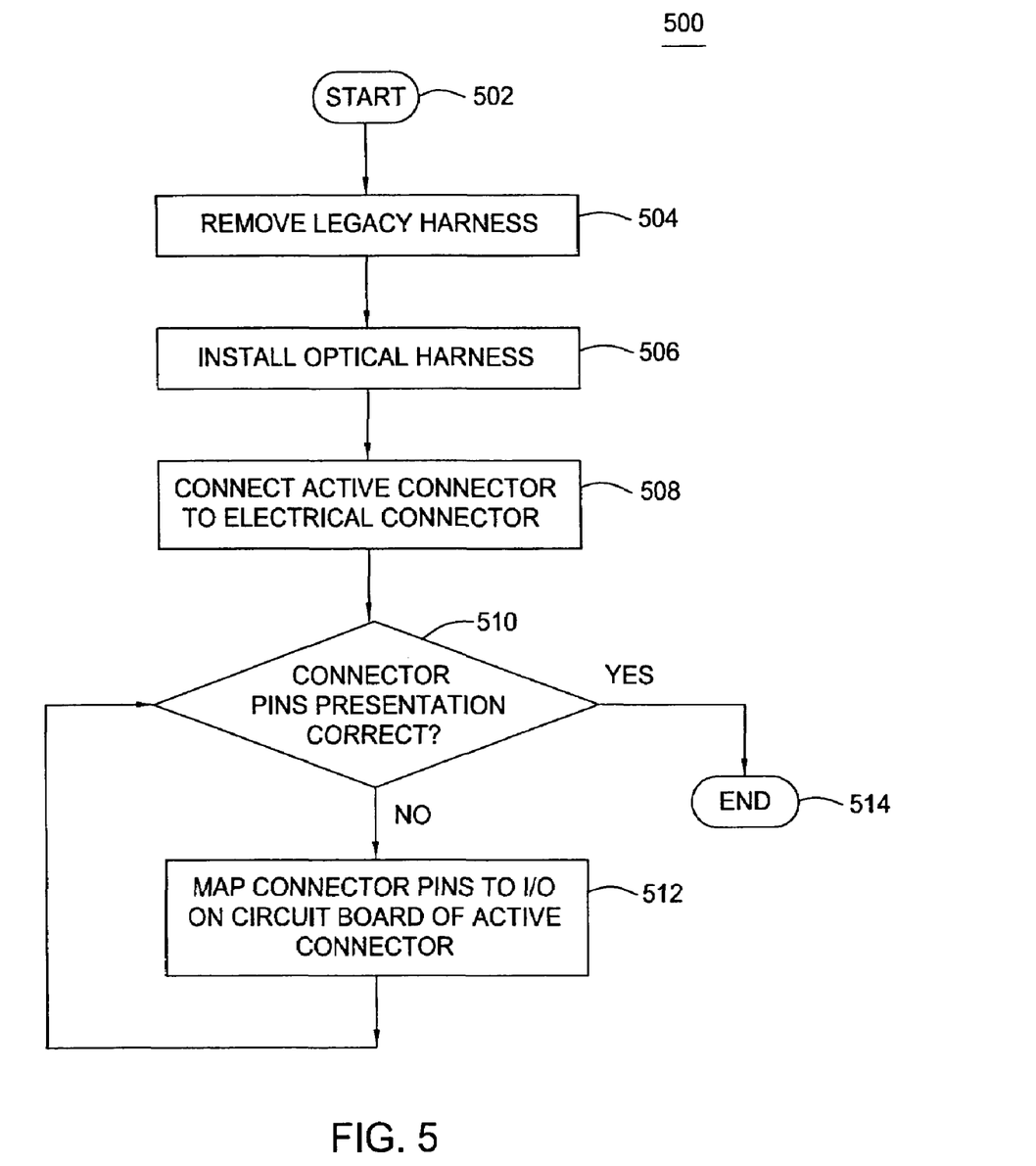
FIG. 5 depicts a flow diagram of a method of replacing a legacy wiring harness assembly with the optical harness assembly of FIG. 1, 2 or 3 in accordance with an embodiment of the present invention.

FIG. 5 depicts a flow diagram describing a method 500 of replacing a legacy system's wiring harness assembly with an optical harness assembly as described in connection with FIGS. 1 through 4.

For ease of reference, FIGS. 1 through 5 should be reviewed together. The method 500 begins at step 502 and moves to step 504 where the legacy wiring harness system is removed from a vehicle, for example an aircraft, watercraft or land vehicle. For purposes of clarity in describing the method in accordance with this embodiment, a legacy system, for example, in an aircraft is described. However, it is contemplated by other embodiments of the present invention to include any legacy system in any vehicle where a benefit would be derived by replacing it with an optical harness assembly as described herein.

At step 506, an optical harness assembly, as described in any of FIGS. 1-4, is installed in the platform configuration to replace the legacy harness just removed. The electrical connectors that are coupled to the legacy terminal equipment or LRUs remain intact. Alternatively, electrical connectors that resemble the legacy electrical connectors may be retrofitted into the system. Either way, at step 508, the active connector conversion units 406 are installed during the installation of the harness assemblies and are connected to the electrical connectors of the terminal equipment. Alternatively, the electrical connectors are integrated with the active connector conversion devices.

At step 510, the electrical connector pin presentation of each electrical connector is tested to determine if any adjustments, through the personality adaptor or otherwise, need to be made so that the active connector conversion units can properly send and receive data signals. If the pin presentation is correct and signals are transmitted and received correctly, the method ends at step 524. If the pin presentation is not correct, the connector pins are mapped to the I/O on the active connector circuit board at step 512. The test at step 510 is run again until the connector pin presentation is correct.

In one embodiment, there are at least two modes for this built-in test ("BIT") of compatibility. The first is the startup mode and the second is the continuous mode. Results from these BIT modes are used to assert the visual failure indicators in each active connector conversion unit.

When the system powers up, each active connector conversion unit will run a diagnostic. This diagnostic consists of transmitting a data packet, detecting that data packet, and checking the CRC. If the CRC is valid, then the optical data transmission, formatting, framing, and the like can be assumed functional. Testing of functions upstream of the digital transmission channel (analog measurements, bit states, and the like) depends on the particular active connector conversion unit, and inferences that can be made based on the LRU function.

While running each active connector conversion unit will record instances of CRC failures associated with every active connector conversion unit, a record of problematic transmission from each active connector conversion unit to every other is therefore available. Results of this monitoring are encoded into the status bytes transmitted with each frame.

For each function serviced by an active connector conversion unit, a failsafe mode is defined. If a data frame is found to be corrupted or invalid, then the failsafe states are applied to the output pins associated with data that was contained in that frame and the connector pins are mapped to the I/O circuit boards of the active connector conversion unit. Failsafe modes can preserve the previous pin state, or assert (or de-assert) any pin, or set an analog voltage determined to be safe.

Figure 6:
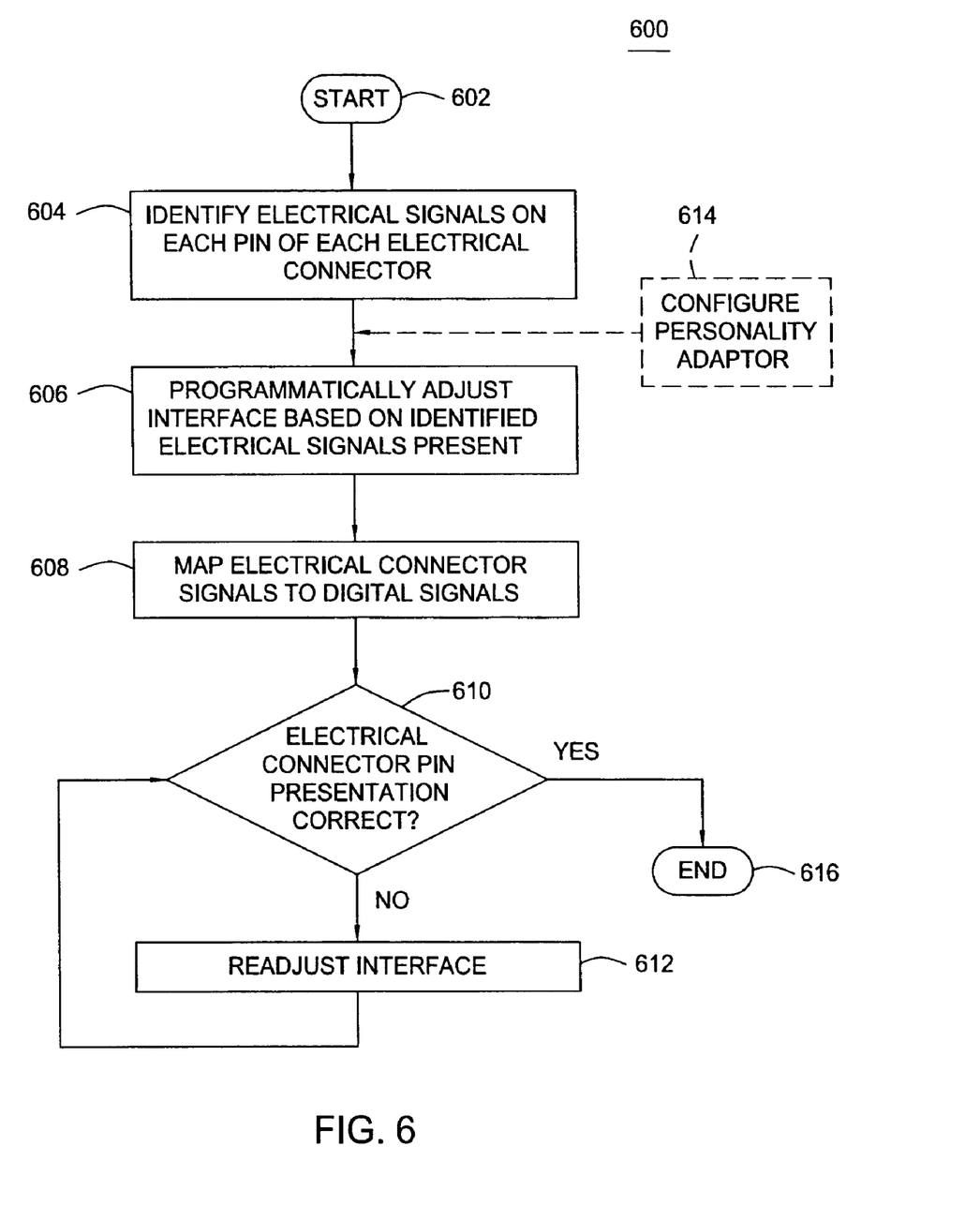
FIG. 6 depicts a flow diagram of the method in accordance with another embodiment of the present invention.

FIG. 6 depicts a flow diagram of another embodiment 600 of the method of the present invention. Specifically, FIG. 6 describes a method for adapting electrical presentations of terminal equipment that is interconnected with the optical harness assembly as described herein and in particular to internal circuitry that converts the electrical signals to optical signals.

This embodiment of the method may utilize circuitry that has a degree of flexibility, embodied by a collection of signal conditioning elements, and by firmware loaded into the field programmable gate array (FPGA). The signal conditioners translate the electrical signals that are presented by the terminal equipment, into digital signals that can be manipulated by the FPGA. The action of these signal conditioners is controlled by the FPGA. In this way, a degree of flexibility is obtained in mapping the electrical signals presented, and the circuit resources within the terminal equipment.

In cases where the logic device, e.g., hardware, firmware or software, is capable of mapping electrical signals presented by the terminal equipment, the embodiment described with respect to FIG. 5 is contemplated. Alternatively, however, the electrical signals present on each pin of each electrical connector presentation may sometimes need to be identified before an optical harness is deployed to replace a legacy wire harness on a given platform. In some cases, the flexibility of the signal conditioners and the FPGA is sufficient to map the electrical presentation to the digital transmission. The method of replacement is to design specific firmware according to the identified electrical presentation.

Alternatively, the logic device alone, such as the firmware, is not capable of achieving the mapping requirements between the electrical presentations and the FPGA processor. In this alternative embodiment, a hard-wired electrical personality adapter is used. This personality adapter is coupled between the electrical pin out, and the signal conditioning circuitry. For this configuration, the configuration of the personality adapter must be known.

Turning now to FIG. 6, at step 602, the method begins. At step 604, the electrical presentation of each pin of each electrical connector is identified. This may be performed by testing each pin's electrical characteristics. Alternatively, a user may refer to the electrical schematic of the electrical signals present on each pin of each electrical connector presentation. At step 606, an interface logic device, e.g., hardware, software or firmware such as the FPGAs' is programmatically adjusted based on the previously identified electrical signals present. If the FPGAs, for example, are not flexible enough to adjust to the pin presentation of the electrical connector, an alternative step 614 is implemented. During this step, a personality adaptor is configured to map the electrical signals present. The personality adaptor is coupled to the FPGAs, optionally through the signal conditioners. Then, at step 608, the electrical signals are mapped to digital signals through the signal conditioners, described hereinabove.

A test is performed at step 610 to determine if the electrical connector pin presentation is correct. If yes, the method ends at step 616. If no, at step 612, the interface is readjusted. Then a test is performed again. In this embodiment, if the electrical connector pin presentation is not correct, the optical harness may need to be removed so that the personality adaptor (if step 614 is performed) can be rewired. If the personality adaptor is not used, the optical harness may still need to be removed because the interface logic device may need to be reprogrammed.

For diagnostics, an external transceiver is connected as a maintenance unit to the spare port off the star coupler. The maintenance unit acts as another active connector conversion unit on the network bus, and participates in the communications protocol like any other active connector conversion unit. The primary controller addresses the maintenance active connector conversion unit on each poll of the network bus. The maintenance active connector conversion unit may be missing (the normal state of the system), present but only listening (appears to the controller to be missing), or present and in talk mode, participating in the bus protocol.

In listen mode, the maintenance active connector conversion units 'snoops' on all data present on the star coupler, and have access to data transmitted by all active connector conversion units. Because each active connector conversion unit sends status bytes as part of the header of each frame, the maintenance active connector conversion unit can check on the status of each active connector conversion unit on the network bus without interfering with harness operation, nor changing timing or any other aspect of bus operation. The maintenance active connector conversion unit can also 'snoop' on the contents of all data transported between the active connector conversion units so that the state of LRUs outside of the boundary of the active connector conversion unit can be inferred.

As part of the system protocol, the bus controller will poll for the maintenance active connector conversion unit each poll cycle of the bus. The maintenance active connector conversion unit has the option of remaining silent (listen mode) or participating in the bus protocol. Maintenance personnel may choose to activate talk mode, at which point the maintenance active connector conversion unit will participate in the bus protocol by answering polls. In the usual state, the maintenance active connector conversion unit will simply answer with "present" when polled.

When directed by an operator, the maintenance active connector conversion unit can request that the controller issue commands to set analog or digital outputs to requested states, thereby allowing the operator stimulus-based troubleshooting of the system. It is important to note that the maintenance active connector conversion unit does not necessarily directly set the state of the system, but requests the state change through the system controller, such that the network controller remains in control of the network at all times.

Reading the status of all digital and analog ports does not need to be requested from the controller, as that information is always available to the listening port of the maintenance active connector conversion unit.

The fiber protocol is based on frames that are transmitted by active connector conversion units over the fiber. The star topology broadcasts the frame simultaneously to all receivers, each of which must identify and extract appropriate data and control information. Each receiver examines the packet header to determine if it is the intended data recipient.

The packet starts with a set of bytes with high transition density that syncs the clocks in the receivers. A unique frame marker is then sent to identify the beginning of frame. Source and destination connector IDs follow the frame marker, and then a set of status bytes. The status bytes encode information such as active connector conversion unit version, firmware version, self-test results, monitoring results, and the like. The status bytes are followed by a command byte and a cyclical redundancy check ("CRC") byte used to validate the header.

The header may be followed by an optional data packet. The first byte of the data packet is a data identifier used to identify the type of data included in the packet. The data itself is an arbitrary number of bytes followed by another CRC byte set used to validate the data packet.

Large amounts of data are broken up into multiple frames to minimize loss of data should transmission errors be detected. If multiple commands or datasets are transmitted, then the entire frame is repeated. When multiple frames are sent, they are sent contiguously so transmission burst-mode resync time is minimized. The clock sync bytes are only sent once at the beginning of a transmission burst from a given connector.

Each active headshell is a node in an optical network. In the generic architecture, each active headshell contains a network controller responsible for managing communications on the network. In one example, only one network controller is active at a time. The rest of the nodes will function as clients, responding to commands from the active controller. Bus contention is avoided by having the clients transmit data when directed by the controller, a "speak only when asked" protocol.

The primary controller is established at turn-on. Any connector, when turned on, will wait a predefined number of milliseconds before assuming it is the controller. In one embodiment, the maximum number of milliseconds to wait is its address (connector address) plus 1 multiplied by 10 ms. So, for example, connector 0 would wait 10 ms, connector 1 would wait 20 ms, and so on. This simultaneously assures an active controller (if one is available) and establishes controller hierarchy.

If the active controller ceases to function, one of the clients takes over as the active controller. The order in which controllers assert control of the network is predetermined, and is based on timeouts. The secondary controller will assert control if the primary controller is not recognized in time T1. The secondary controller will assert control if neither primary nor secondary controllers assert control within time T2 and so on. Using this technique, the control hierarchy is completely determined, and failsafe modes can be established.

Upgrade strategies can progress along three directions. First, as a complete upgrade, all of the active connector conversion units can be removed from the optical harness assembly and replaced by new active connector conversion units. This allows one to completely change the electrical presentation, connectivity, and underlying functionality of the optical harness assembly. Optical harness assembly installations that interconnect equipment locations can support entirely new equipment suites without the need to remove the old cabling and reinstall modified wiring.

The second upgrade strategy is to add new branches to the optical harness assembly, by attaching additional optical fibers to the optical signal distribution device, e.g., star coupler, or through optical power couplers on existing branches of the optical harness assembly. After making the physical connections to the cabling infrastructure, firmware inside each active connector conversion unit on the optical harness assembly is reprogrammed, to facilitate the new signals and connections.

The third upgrade strategy is to reconfigure the firmware within some or all of the active connector conversion units, in order to support new connectivity, new signal definitions, or signals added at an existing active connector conversion unit. This upgrade strategy is appropriate when an LRU is upgraded, but maintains a similar electrical presentation to the harness. This is the least disruptive of upgrade paths, although all three upgrade strategy embodiments are contemplated by the present invention.

Spare/growth pin/wire practices can be maintained with optical harnesses, although the number of spare wires necessary to maintain the same harness growth potential is reduced, as new signals can typically be multiplexed onto the optical fiber. Only spare/growth need be allocated for power conductors.

Each of these three upgrade strategies is simpler and quicker than the removal of existing equipment to gain access to the cabling, removal of old wiring, installation of new harnesses, and reinstallation of removed equipment. They also reduce the likelihood of collateral damage due to the upgrade maintenance procedure.

The optical harness assembly in accordance with embodiments of the present invention provides the opportunity for prognostics and preventative maintenance, increases platform operational availability, simplifies fault identification and isolation, and allows platform-wide diagnostics of all systems.

The optical harness assembly replaces large numbers of electrical wires with optical fiber and active connector conversion units. Removing these wires eliminates their contributions to several important failure modes: mechanical failure modes of chafing, insulation degradation, and wire breakage; corrosion of metallic conductors, including wires and splices; and ground faults, open connections and short-circuits, and the like.

There is a relatively smaller number of optical fibers, relative to the many electrical wires of a typical harness, making failures statistically less likely; all signals can be carried on a pair of light-weight optical fibers, so that spare optical fibers can be pre-installed, without significant additional weight, in case of failure. By increasing the reliability of the cabling infrastructure, maintenance requirements are moved to the endpoints of the harness, where maintenance activities are easier to perform and less time-consuming.

The optical harness assembly is a self-diagnosing system. Each active connector conversion unit on the harness assembly has BIT capability, continuously verifying its health and operational status. In addition, equipment within each active connector conversion unit, together with the optical fiber and cabling equipment, is made redundant. In this way, failure of a component within the redundant equipment can be bypassed, diagnosed, and replaced during regular maintenance. This provides definitive prognostic and diagnostic benefits.

Another advantage of embodiments of the present invention is that each active connector conversion unit on the optical harness assembly has a visual fault indicator, as discussed previously, that identifies a failed component within the connector. Maintenance staff need only visually inspect the connectors in order to identify a failure condition, not the entire length of the harnesses.

The optical harness assembly contains power wires that bring power to the active connector conversion units, both to route power within the harness as in the legacy electrical harness, and also to power the active connector conversion unit equipment. The availability of electronic prognostic and diagnostic monitoring equipment inside the active connector conversion units provides the opportunity to monitor the power wires, as well. Power wires equipped in this manner become able to diagnose their condition, and identify impending failures.

In addition to the active connector conversion units that take the place of legacy electrical connectors, a further advantage contemplated by embodiments of the present invention is that the optical harness assembly can be supplied with a maintenance connector. This connector provides complete access to all of the signals on the harness assembly, as well as to the control circuitry installed into each active connector conversion unit. Through the maintenance connector, field personnel can determine the status of substantially all connections on the harness, as well as monitor signals being communicated between LRUs, to check for proper LRU operation. Maintenance connectors from multiple harnesses can be interconnected to centralized diagnostic and maintenance equipment, in order to provide combined access to all harnesses on a platform. This can be used for centralized evaluation of all harnesses, as well as for archival recording of communications between subsystem equipment.

Establishing a proactive maintenance approach to harnesses begins with the active connector conversion units of optical harness assembly. Redundant equipment inside each active connector conversion unit provides spare equipment in the event of a failure. When components in the primary communications path fail, redundant equipment is activated, and a failure condition is indicated. The harness remains fully functional during this soft-fail condition.

In one embodiment, preventative maintenance can be performed on a periodic basis at the organizational level. This involves checking the optical harness assembly for indicated failure conditions. In the event of a failure, the failed active connector conversion unit can be removed, and replaced with a spare at the organization level of maintenance, according to MIL-HDBK-470.

This procedure, which may be performed by maintenance personnel in the field, is a relatively quick and simple activity. It involves removing the backshell strain relief, disconnecting the cable from the failed active connector conversion unit, attaching a spare active connector conversion unit, and replacing the backshell strain relief. This procedure is more advantageous than that required for legacy electrical harnesses, where faults in the electrical wiring must be identified, diagnosed, located, and repaired by hand, often accompanied by collateral damage to neighboring wiring and equipment.

The faulty active connector conversion unit can be discarded, or it can be repaired as part of a corrective maintenance program at the intermediate level. Repair of the active connector conversion unit requires that the backshell be opened, the failed circuit board removed, and a spare circuit board installed. The firmware of the active connector conversion unit is then programmed, either by embedded internal firmware, or by using a laptop computer-based configuration tool. Programming of the firmware using incorrect code is prevented by hardware keying of the active connector conversion unit circuitry.

Electrical wiring harnesses are typically some of the first pieces of equipment installed into a new platform. Often, construction of the harness is completed during installation onto the platform, making removal impossible without disassembly. After installation, LRUs are added and attached to the wiring harness. In the event that chafing, corrosion, or other failure requires the replacement of a wiring harness, the down-time associated with removal of the wiring harness, and all equipment that blocks access to the wiring harness, can be enormous. In addition, the requirement to overhaul, remove and replace the wiring harness, in order to perform minor upgrades to attached equipment, creates barriers to modifications of the systems on the platform.

While the foregoing is directed to specific embodiments of the present invention, other and further embodiments of the present invention may be devised without departing from the basic scope thereof, and the scope thereof is determined by the claims that follow.

What is claimed is:

1. A method of retrofitting an optical cable harness assembly into an existing platform, the optical cable harness assembly having at least one optical cable harness having a termination end; at least one electrical connector having connector pins for transporting electrical signals; and at least one active connector conversion unit coupled between the termination end of the optical cable harness and the electrical connector; the method comprising:

removing a legacy wiring harness;

installing the optical cable harness assembly; and testing the compatibility of the connector pins of the electrical connector with the active connector conversion unit;

wherein testing comprises transmitting a data packet, detecting the data packet, and checking the cyclical redundancy check (CRC) for validity.

2. The method of claim 1, wherein, if the CRC is invalid, the method further comprises mapping the connector pins to the I/O ports of signal conditioning circuitry on the active connector conversion unit.

3. The method of claim 1, further comprising retrofitting electrical connectors that resemble the legacy electrical connectors into the platform.

4. The method of claim 1, wherein the installing step comprises installing the active connector conversion units.

5. The method of claim 4, wherein the active connector conversion units are connected to the electrical connectors of terminal equipment.

6. The method of claim 1, wherein the testing step comprises testing the compatibility in startup mode.

7. The method of claim 1, wherein the testing step comprises testing the compatibility in continuous mode.

8. The method of claim 1, further comprising defining a failsafe mode for each function serviced by each of the active connector conversion units.

9. The method of claim 8, wherein during the testing step, if data is determined to be corrupt or invalid, then the method further comprises:
   applying failsafe states to the output pins associated with data that was contained in the respective active connector conversion unit; and
   mapping the connector pins to the I/O circuit boards of the active connector conversion unit.

10. A method of retrofitting an optical cable harness assembly into an existing platform, the optical cable harness assembly having at least one optical cable harness having a termination end; at least one electrical connector having connector pins for transporting electrical signals; and at least one active connector conversion unit coupled between the termination end of the optical cable harness and the electrical connector; the method comprising:
   removing a legacy wiring harness;
   installing the optical cable harness assembly; and
   testing the compatibility of the connector pins of the electrical connector with the active connector conversion unit;
   wherein, if compatibility fails, then mapping respective connector pins to I/O ports of signal conditioning circuitry.

11. The method of claim 10, wherein the mapping step comprises coupling a personality adaptor between the connector pins of each electrical connectors and the respective active connector conversion unit.

12. A method of retrofitting an optical cable harness assembly into an existing platform, the optical cable harness assembly having at least one optical cable harness having a termination end; at least one electrical connector having connector pins for transporting electrical signals; and at least one active connector conversion unit coupled between the termination end of the optical cable harness and the electrical connector; the method comprising:
   removing a legacy wiring harness;
   installing the optical cable harness assembly;
   testing the compatibility of the connector pins of the electrical connector with the active connector conversion unit; and
   defining a failsafe mode for each function serviced by each of the active connector conversion units;
   wherein during the testing step, if data is determined to be corrupt or invalid, then the method further comprises:
      applying failsafe states to the output pins associated with data that was contained in the respective active connector conversion unit; and
      mapping the connector pins to the I/O circuit boards of the active connector conversion unit.

* * * * *